United States Patent [19]

Herickhoff et al.

[11] 3,731,139

[45] May 1, 1973

[54] INTERFACE AMPLIFIER

[75] Inventors: Robert J. Herickhoff, Mankato, Minn.; William D. Kimmel, Saint Paul, Minn.

[73] Assignee: The United States of America as represented by the Secretary of the Air Force

[22] Filed: Nov. 16, 1970

[21] Appl. No.: 90,072

[52] U.S. Cl. ....................315/33, 174/17.05, 315/33, 315/85, 313/239, 313/336, 315/58, 313/313, 330/68

[51] Int. Cl. ....................H01j 7/44

[58] Field of Search ....................313/53, 37, 313, 313/324, 220.1; 174/17.05, 9, 17.08, 3.5 R; 315/85, 32; 250/108; 330/68

[56] References Cited

UNITED STATES PATENTS 2,574,000 11/1957 Victoreen....................315/37
2,287,845 6/1942 Varian et al....................315/53 X
2,797,266 6/1957 Diemer et al....................315/37 X
3,225,199 12/1965 Tolmie....................250/108 X

*Primary Examiner*—Nathan Kaufman
*Attorney*—Harry A. Herbert, Jr. and George Fine

[57] ABSTRACT

An electrical monitoring apparatus having a single ceramic envelope encased in a ground shield with two separated evacuated compartments, contained in one of the compartments are the active electrical components of a vacuum tube amplifier and in the other compartment are the associated passive electrical components that are used in conjunction with the operation of the vacuum tube amplifier. The input terminal to the amplifier is physically positioned at one end of the ceramic envelope, while the output and all other circuit connections are at the other end. Thus, the possibility of electrical interference due to radiation effects when the apparatus is used in a gamma environment are minimized.

5 Claims, 1 Drawing Figure

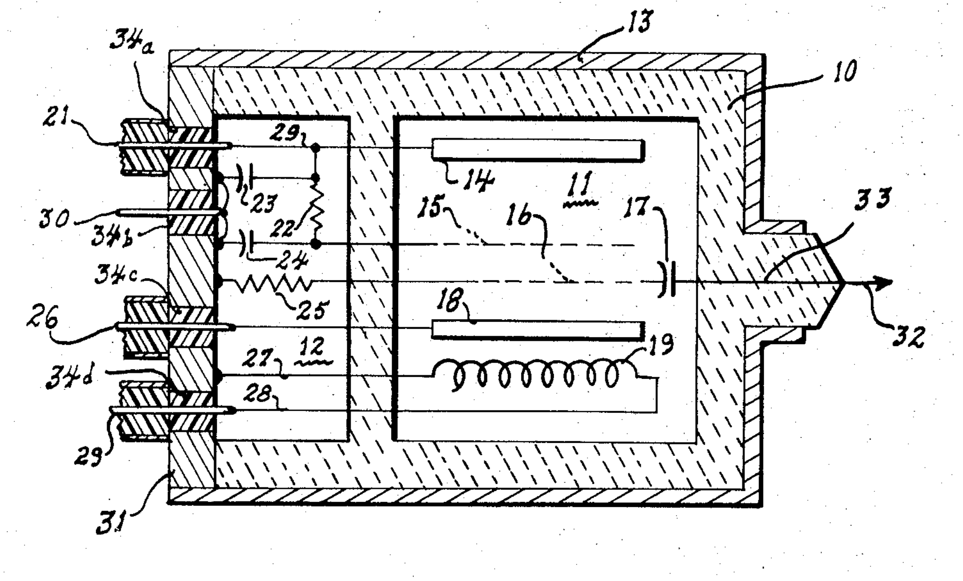
INVENTORS.
ROBERT J. HERICKHOFF
WILLIAM D. KIMMEL
BY Harry A. Herbert Jr and George Fine
ATTORNEYS

INTERFACE AMPLIFIER

BACKGROUND OF THE INVENTION

The present state of the art interface amplifiers in gamma radiation environments suffer adversely due to the effects of secondary electron emission. These emission effects cause the distortion of the signal characteristics being passed to the recorder. The best approach to the amplifier design for this application has been found to be semiconductor differential amplifiers in the later stages with a tube-type cathode follower for the input stage to provide high input impedance and to minimize the adverse effects of gamma radiation. However, no tubes are specifically designed to reduce gamma radiation effects. Some of the principal problems in monitoring voltages in high intensity gamma environments are ionization leakage around the passive components, between adjacent terminals of the vacuum tube, and across the grid-to-test point cable connection, as well as secondary electron emission from the grid. There is a need for a tube with separated pins and designed so that isolation can be obtained which insures that no dielectric breakdown or leakage between the pins occurs during radiation. The tube must also be made of materials such as ceramic dielectrics and low atomic number metals with a high work function so that secondary emission is minimized. These materials should be used in both the envelope, the supports for grid, cathode, plate, etc. and all interior parts instead of metallic supports as used in present available tubes.

SUMMARY OF THE INVENTION

The present invention provides a vacuum tube amplifier with a grounded shield ceramic envelope containing a vacuum-enclosed cathode-follower which is used as an interface element between the unit under test and the recording instrument for monitoring voltages in a pulsed gamma radiation environment. When a circuit in a gamma radiation environment is being monitored, the generated electrical noise obscures the true voltage conditions which can not be accurately recorded in the recording device's film memory. The present invention provides a significant reduction in the radiation-induced electrical noise in the interface amplifier, and thus permits the accurate reproduction of the voltage conditions existing within the circuit under test. This reduction in the electrical interference is achieved by the structural arrangement of the container and leads which is positioned to minimize to the greatest possible extent the interference effects due to ionization, secondary electron emission and the electrical interconnections.

It is the object of the present invention to provide an interface apparatus which will be unaffected by to gamma radiation.

It is a further object of the present invention to provide an interface amplifier which will operate without interference in a gamma radiation environment.

It is still another object to provide an interface amplifier having two separated evacuated compartments, one of which contains the active vacuum tube component and the other contains the associated inactive circuit components.

These and other advantages, features and objects of the invention will become more apparent from the following description taken in connection with the illustrative embodiment in the accompanying drawing.

BRIEF DESCRIPTION OF THE DRAWING

FIG. 1 is a cross-sectional view of the preferred embodiment of the invention.

DESCRIPTION OF THE PREFERRED EMBODIMENT

Referring to FIG. 1, the tube therein shown is a conventional tetrode with the usual glass vacuum tube envelope removed and replaced by a modified ceramic envelope 10 having upper and lower isolated vacuum chambers 11 and 12. The tube as shown contains two vacuum chambers, but a single or multiple chamber may be used. The envelope may be made of ceramic or other suitable material which is unaffected by gamma radiation and is completely surrounded by a ground shield 13. The vacuum tube elements, the active components, are accommodated within the upper isolated vacuum chamber 11, while the lower isolated vacuum chamber 12 contains the circuit elements, the passive components. The vacuum tube elements which are contained in the upper isolated vacuum chamber 11 are the anode 14, the screen grid 15, the control grid 16 with its input coupling capacitor 17, the cathode 18 and the heater winding 19. These vacuum tube elements are conventional and are operated in the normal manner. The lower isolated vacuum chamber 12 contains the power supply lead 20 coupling the anode to the power supply terminal 21, the bias resistor 22 with the bypass capacitors 23, 24 which is coupled between the power supply lead 20 and the screen grid 15, the grid resistor 25 which is coupled between the ground shield 31 and the control grid 16, the cathode 18 to the output lead 26, and the heater leads 27, 28 which are coupled between the ground shield 31 and the heater terminal 29. The passive components in the lower isolated vacuum chamber 12 generally form the anode, cathode and grid circuits of the vacuum tube and are ordinarily connected to the power supply, the output or the ground terminals.

In the configuration shown, the upper chamber which contains the vacuum tube elements, the active components, is at a high vacuum while the lower chamber which contains the passive components may be at the same or a lower vacuum than the upper chamber. The input terminal 32 to the control grid 16 of the vacuum tube of the invention is arranged to be separated from the other vacuum tube terminals by entering the ceramic envelope at the end of the tube opposite all the other leads. The power supply, heater, ground and output terminals 21, 26, 29, 30 are physically separated from the input lead to the control grid 16 in order to minimize the ionization leakages between adjacent terminals of the circuit. Ceramic materials **34*a*–34*d* are provided around terminals 21, 26, 29 to isolate them from ground shield 31. Ceramic materials 34*a*–34*d* are identical to the material utilized in ceramic envelope 10. The wires which are coupled from the power supply output and heater terminals 21, 26, 29** to the power supply and recording instrument, respectively, are enclosed in insulated ground shielded cables. The cable ground sheath is connected directly to the ground shield surrounding the individual terminals extending from the interface device. Thus the signal integrity is preserved after its passage through the interface device and en route to the recording instrument. The shielding of the external cables to the interface device provides a further safeguard against electrical interference effects due to gamma radiation.

Additional minimization of ionization leakage between the adjacent terminals may be obtained by increasing the spacing between these terminals and shielding each individual terminal by means of a ground plane. The passive components forming part of the vacuum-tube circuit are enclosed in the lower isolated vacuum chamber 12. The leakage around the passive components may be eliminated by enclosing the entire circuit in a shielded vacuum-tight chamber and by bringing only the necessary leads out of the vacuum chamber. The lower isolated vacuum chamber 12 differs slightly from the construction of the upper isolated vacuum chamber 11 which is entirely enclosed in the ceramic envelope 10. The lower portion of the lower isolated vacuum chamber is comprised of the ground shield 31 which forms a vacuum-tight seal with the ceramic envelope 10 to completely enclose the passive components, thereby preventing the inducement of any electrical interference in the passive components due to the effects of gamma radiation. The reduction of a secondary electron emission from the control grid 16 is further achieved by minimizing the mass of both the grid element and the grid lead 33, by reducing or eliminating the metallic grid supports (not shown) which are ordinarily used on a conventional vacuum tube and by using a low Z metal for the grid.

Although the invention has been described with reference to a particular embodiment, it will be understood to those skilled in the art that the invention is capable of a variety of alternative embodiments within the spirit and scope of the appended claims.

We claim:

1. An electron discharge device comprising in combination a base having external terminals pins mounted in and insulated from said base, a ceramic envelope mounted on said base forming an airtight seal between said base and said ceramic envelope, a subsequently evacuated ceramic partition within said envelope forming upper and lower isolated chambers, said upper isolated vacuum chamber containing the active electrode elements of a vacuum tube one of which is a control grid, said lower isolated vacuum chamber containing the passive electronic circuit components associated with said active electrode elements, said passive electronic circuit components being coupled through said ceramic partition to their associated active electrode elements to provide a source of potential, control bias, and output connection, said external terminal pins being coupled to their associated passive electronic circuit components within said lower isolated vacuum chamber, an input terminal positioned in said ceramic envelope opposite to said base, an input coupling capacitor also positioned in said upper isolated vacuum chamber, said input coupling capacitor interconnecting said control grid and said input terminal, and a ground shield completely enclosing said ceramic envelope and said base wherein electrical interference effects are reduced effectively.

2. An electron discharge device according to claim 1 wherein said active electrode elements are comprised of an anode, a screen grid, a control grid, and a heater.

3. An electron discharge device according to claim 2 wherein said passive electronic circuit components are comprised of a bias resistor for its associated screen grid, a bypass capacitor for its associated anode, a grid resistor for its associated control grid, and heater leads for its associated heater.

4. An electron discharge device according to claim 1 wherein said upper isolated vacuum chamber is provided with a high vacuum and said lower isolated vacuum chamber is provided with substantially the same vacuum as said upper isolated vacuum chamber.

5. An electron discharge device according to claim 1 wherein said upper isolated vacuum chamber is provided with a low vacuum and said lower isolated vacuum chamber is provided with a lower vacuum than said upper isolated vacuum chamber.

* * * * *